US012693590B2

(12) United States Patent (10) Patent No.: US 12,693,590 B2

Hetzer et al. (45) Date of Patent: Jul. 28, 2026

---

(54) PRINTED CIRCUIT BOARD WITH AN IMAGE SENSOR FOR A CAMERA DEVICE FOR A VEHICLE AND A METHOD FOR PRODUCING A CAMERA DEVICE

(71) Applicant: Robert Bosch GmbH, Stuttgart (DE)

(72) Inventors: Florian Hetzer, Immenstadt (DE);
Holger Braun, Stuttgart (DE);
Johannes Fickler, Kempten (DE);
Markus Weimert, Immenstadt (DE)

(73) Assignee: ROBERT BOSCH GMBH, Stuttgart (DE)

( * ) Notice: Subject to any disclaimer, the term of this patent is extended or adjusted under 35 U.S.C. 154(b) by 31 days.

(21) Appl. No.: 18/838,313

(22) PCT Filed: Mar. 6, 2023

(86) PCT No.: PCT/EP2023/055540
§ 371 (c)(1),
(2) Date: Aug. 14, 2024

(87) PCT Pub. No.: WO2023/180048
PCT Pub. Date: Sep. 28, 2023

(65) Prior Publication Data

US 2025/0147404 A1      May 8, 2025

(30) Foreign Application Priority Data

Mar. 22, 2022    (DE) .................... 10 2022 202 777.9

(51) Int. Cl.
*G03B 43/00*          (2021.01)
*G03B 17/12*          (2021.01)
(Continued)

(52) U.S. Cl.
CPC ............. *G03B 43/00* (2013.01); *G03B 17/12* (2013.01); *G03B 30/00* (2021.01); *H04N 23/54* (2023.01)

(58) Field of Classification Search
CPC ........ G03B 43/00; G03B 17/12; G03B 30/00; H04N 23/54
See application file for complete search history.

(56) References Cited

U.S. PATENT DOCUMENTS 8,444,427 B2 * 5/2013 Hashimoto .......... H01R 12/774
439/325
11,194,230 B2 12/2021 Rafalowski et al.
(Continued)

FOREIGN PATENT DOCUMENTS

DE          102020206331 A1    11/2021
DE          102020208805 A1    1/2022
(Continued)

OTHER PUBLICATIONS

International Search Report for PCT/EP2023/055540, Issued Jun. 22, 2023.

*Primary Examiner* — Padma Haliyur
(74) *Attorney, Agent, or Firm* — NORTON ROSE FULBRIGHT US LLP

(57) ABSTRACT

A method for producing a camera device. The method includes: providing a printed circuit board with an image sensor; mounting an electrical contact element having an electrical contact surface on the printed circuit board; aligning a lens accommodated in a housing of the camera device and includes an electrically conductive contact region; fixing the lens in the housing; bringing into contact the electrically conductive contact region of the lens with the electrical contact surface. The electrical contact element includes a movable spring arm, on which the electrical contact point is disposed, and a movable latching arm. The latching arm (Continued)

locks the spring arm in a first position until the step of bringing into contact. In the step of bringing into contact, the locking of the spring arm is released by a temporary mechanical pulse applied to the latching arm by means of a release tool.

9 Claims, 5 Drawing Sheets

(51) Int. Cl.
| | | |
|---|---|---|
| *G03B 30/00* | (2021.01) | |
| *H04N 23/54* | (2023.01) | |

(56) References Cited

U.S. PATENT DOCUMENTS

| | | | | |
|---|---|---|---|---|
| 2004/0247311 | A1* | 12/2004 | Ajiki | H04N 23/54 |
| | | | | 348/E5.027 |
| 2009/0191755 | A1* | 7/2009 | Ma | H01R 13/658 |
| | | | | 439/607.1 |
| 2016/0085138 | A1* | 3/2016 | Awazu | H01R 12/59 |
| | | | | 359/811 |
| 2017/0201661 | A1* | 7/2017 | Conger | H01R 12/716 |
| 2019/0302576 | A1* | 10/2019 | Rafalowski | B60S 1/026 |
| 2019/0393647 | A1* | 12/2019 | Nguyen | H01R 12/79 |
| 2021/0197733 | A1* | 7/2021 | Percival | G03B 17/02 |
| 2022/0334461 | A1* | 10/2022 | Alm | B60R 11/04 |

FOREIGN PATENT DOCUMENTS

| | | | |
|---|---|---|---|
| DE | 102020209839 | A1 | 2/2022 |
| DE | 102020216531 | A1 | 6/2022 |
| EP | 1622362 | A1 | 2/2006 |
| JP | 06-029367 | Y | 8/1994 |
| WO | 2022167220 | A1 | 8/2022 |

* cited by examiner

100

PRINTED CIRCUIT BOARD WITH AN IMAGE SENSOR FOR A CAMERA DEVICE FOR A VEHICLE AND A METHOD FOR PRODUCING A CAMERA DEVICE

FIELD

The present invention relates to a method for producing a camera device and a camera device.

BACKGROUND INFORMATION

German Patent Application NO. DE 10 2020 206 331 A1 describes a camera module for a motor vehicle that comprises a lens assembly with at least one lens and at least one electrical contact surface, a printed circuit board assembly with at least one printed circuit board on which an image sensor and at least one electrically conductive connection unit are disposed, an alignment element which is positioned between the lens assembly and the printed circuit board assembly so that the lens assembly can be attached to the printed circuit board assembly in a position optically aligned with the image sensor, and a force exerting element which is configured to exert a force on the electrically conductive connection unit such that the electrically conductive connection unit and the electrical contact surface can be connected to one another and at least one electrical current path can be formed by means of which at least one electrical consumer on the lens assembly can be electrically connected to the printed circuit board.

SUMMARY

The present invention relates to a method for producing a camera device. According to an example embodiment of the present invention, the method comprises the step of providing a printed circuit board with an image sensor disposed upon it; mounting at least one electrical contact element comprising a respective electrical contact surface on the printed circuit board; aligning a lens accommodated in a housing of the camera device and having an electrically conductive contact region in relation to the image sensor; fixing the lens in the housing and bringing into contact the electrically conductive contact region of the lens with the electrical contact surface of the electrical contact element.

According to an example embodiment of the present invention, the electrical contact element comprises a movable spring arm, on which the electrical contact point is disposed, and a movable latching arm. The latching arm locks the spring arm in a first position until the step of bringing into contact. In the step of bringing into contact, the locking of the spring arm is released by a temporary mechanical pulse applied to the latching arm by means of a release tool.

The camera device produced by the method of the present invention can be used in a vehicle. Within the meaning of the present invention, a lens is understood to be any components that are fixedly connected to the lens and are aligned together as a unit when being aligned with respect to the image sensor. The lens in particular comprises a lens housing and at least one optical lens disposed in the lens housing. The lens can also comprise an electrical consumer. An electrical consumer can be a lens heater, for example. The electrical consumer of the lens can be electrically connected to the electrically conductive contact region. The electrical consumer of the lens can be controlled via the electrically conductive contact region. The electrically conductive contact region of the lens is in turn in contact with the electrical contact surface of the at least one electrical contact element. The at least one electrical contact element, on the other hand, is mounted on the printed circuit board. Mounting in particular creates a respective electrical contact between the electrical contact element and the printed circuit board. The method presented here can thus be used to bring the electrical consumer of the lens into electrical contact with the printed circuit board. In other words, the electrical consumer can be supplied with electricity via the printed circuit board. In other words, the electrical contact element is in particular configured to transmit electrical energy from a printed circuit board to an electrical consumer comprising an electrically conductive contact region. The electrical consumer can also be part of a component other than the lens.

According to an example embodiment of the present invention, an electrical contact element (also referred to briefly as a contact element) is in particular configured as a single contact. If a lens housing of the lens is made of a metallic material, exactly one electrical contact element mounted on the printed circuit board can be sufficient. If a lens housing of the lens is made of a non-metallic material, at least two electrical contact elements are advantageously mounted on the printed circuit board. In this case, two contact elements can be mounted on opposite sides of the printed circuit board and brought into contact with two contact surfaces of the electrically conductive contact region of the lens that are disposed diametrically opposite to one another on the outer periphery of the lens.

According to an example embodiment of the present invention, fixing the lens in the housing in particular takes place after the lens has been aligned in order to fix the alignment of the lens with respect to the image sensor. The lens can be fixed in the housing by means of an adhesive connection or a weld connection, for example.

According to an example embodiment of the present invention, the electrical contact element is in particular made of an electrically conductive material. The electrical contact element is in particular made of a material with bending and/or spring properties. This makes it possible to ensure reliable contact. The electrical contact element is in particular so flexible and/or resilient that the contact with the electrically conductive contact region of the lens is reliably established. The spring arm with the electrical contact point is in particular configured such that it is oversprung. This makes it possible to ensure that a defined contact force on the electrically conductive contact region of the lens is maintained when the contact is established, even if the distance between the lens and the electrical contact element is variable. In other words, contact is not only possible at only one distance between the lens and an electrical contact element; rather the distance can lie within a predetermined range. Contact is thus advantageously independent of the size of the housing. For improved electrical contact, the electrical contact surface of the electrical contact element can be surface-coated, for example with a nickel-gold alloy.

A temporary mechanical pulse can be understood to be a short-term pressure on the latching arm. The release tool in particular exerts a short term pressure on the latching arm. The latching arm can also comprise a release clip, for example. In this case, the release tool applies the temporary mechanical pulse to the release clip.

An advantage of the present invention is that contact is established only after the lens has been aligned with respect to the image sensor. The alignment can thus remain unaffected by any contact forces on the lens. Friction between the electrical contact element and the lens during alignment can be avoided. This makes it possible to prevent the occurrence of abrasion during alignment, for example in the form of particles which would cover the image sensor and thus negatively affect image recording by the camera device.

In an advantageous example embodiment of the present invention, it is provided that, in the step of mounting, the electrical contact element is sucked onto a suction surface of the electrical contact element by means of a fitting tool and positioned on a standing surface of the electrical contact element on the printed circuit board. In the step of mounting, a solder connection is also formed between the standing surface and the printed circuit board. Alternatively, the electrical contact element is pressed into the printed circuit board in the step of mounting.

The contact elements can thus be mounted on the printed circuit board as part of an SMD assembly (surface mounted device). The contact elements can in particular be mounted on the printed circuit board together with other components. This advantageously makes it possible to keep the cost of manufacturing the camera device low. Mounting the contact elements can moreover be largely independent of the size of the housing. This makes creating the contact universally usable, for example for camera devices of different sizes. The same contact elements can be used for different camera devices. The suction surface can be configured as a region of the spring arm or as a region of the latching arm. The fitting tool can in particular be a vacuum fitting tool. For improved electrical contact, the standing surfaces of the electrical contact elements can be surface-coated, for example with a nickel-gold alloy.

Fastening the contact element to the printed circuit board by means of a solder connection is easy to implement in terms of process technology during the assembly of the printed circuit board, for example also with other components. The solder connection can also be used to bring the electrical contact element and the printed circuit board into electrical contact.

However, if it is difficult or even impossible to create a solder connection due to the given geometries, press-fitting provides an alternative, in particular a very stable one, for attaching the contact element to the printed circuit board. In this case, the electrical contact element in particular also comprises a press-fit contour. The press-fit contour can be aligned from the standing surface to a side facing away from the suction surface. A sleeve with a conductor track leading away from the sleeve on an underside of the printed circuit board is in particular also disposed in the through-opening of the printed circuit board. The press-fit contour of the electrical contact element can be pressed into the through-opening of the printed circuit board. The press-fit contour and the sleeve in the through-opening can then be in electrical contact.

In a further advantageous example embodiment of the present invention, it is provided that the electrical contact element comprises a passage in or near the standing surface, and the printed circuit board comprises at least one through-opening and the electrical contact element is positioned on the printed circuit board in the step of mounting such that the passage and the through-opening adjoin one another. To trigger the temporary mechanical pulse, the release tool is pushed from a side of the printed circuit board facing away from the lens through the through-opening of the printed circuit board and the adjoining passage of the electrical contact element. The printed circuit board in particular comprises exactly one through-opening for each electrical contact element mounted upon it.

This manner of releasing the locking can be used in particular when the electrically conductive contact region is disposed on the outer periphery of the lens. According to an example embodiment of the present invention, the release tool is dimensioned such that it can be pushed so far through the through-opening and the passage that it hits the latching arm. The release tool can be configured as a pin, for example. The diameter of the pin is in particular somewhat smaller than the diameter of the through-opening and the diameter of the passage. The pin is in particular long enough to hit the latching arm and cause the temporary mechanical pulse to be applied to the latching arm. The advantage of this embodiment is that the step of bringing into contact does not affect the aligned and fixed lens. The release tool can moreover be guided precisely through the through-opening and the passage. This makes it possible to prevent slipping of the release tool when it is pushed through the through-opening and passage. This ensures that the release tool exerts sufficiently high pressure on the latching arm. The locking can be reliably released. This is highly advantageous, in particular for mass production of the camera device.

In a further advantageous example embodiment of the present invention, it is provided that the printed circuit board comprises at least one through-opening and the electrical contact element is positioned in the step of mounting on the printed circuit board such that at least a portion of the latching arm points through the through-opening to a side facing away from the lens, and, to trigger the temporary mechanical pulse, the release tool is pushed parallel to the printed circuit board along the side facing away from the lens. The printed circuit board in particular comprises exactly one through-opening for each electrical contact element mounted upon it.

This manner of releasing the locking can be used in particular when the electrically conductive contact region is disposed on a side of the lens facing the printed circuit board. The release tool can be configured as a pin, for example. The pin is in particular long enough to hit the latching arm and cause the temporary mechanical pulse to be applied to the latching arm. The advantage of this embodiment is that the step of bringing into contact does not affect the aligned and fixed lens. The locking can be reliably released. This is highly advantageous, in particular for mass production of the camera device.

In a further advantageous example embodiment of the present invention, the method comprises the further step of arranging and attaching a lid to the housing of the camera device on a side facing away from the lens. The lid can have an opening through which a plug can be pushed into the lid. The plug can be used to bring the printed circuit board into contact with a power source outside the camera device.

The present invention also relates to a camera device for a vehicle. According to an example embodiment of the present invention, the camera device comprises a printed circuit board with an image sensor disposed upon it, at least one electrical contact element which comprises an electrical contact surface and is mounted on the printed circuit board, a housing, a lens which is accommodated and fixed in the housing, is aligned with the image sensor and comprises an electrically conductive contact region, and the electrically conductive contact region of the lens is configured to be in contact with the electrical contact surface of the electrical contact element.

According to an example embodiment of the present invention, the electrical contact element comprises a movable spring arm, on which the electrical contact point is disposed, and a movable latching arm. The latching arm is configured to lock the spring arm in a first position. To form the contact between the electrically conductive contact region of the lens and the electrical contact surface of the electrical contact element, the locking of the spring arm in the camera device is configured such that it is released.

The camera device according to the present invention presented here is in particular produced according to the above-described method of the present invention.

In an advantageous example embodiment of the present invention, each electrical contact element comprises a suction surface and a standing surface, wherein a solder connection is formed between each standing surface and the printed circuit board, or wherein the standing surface of the electrical contact element is pressed into the printed circuit board. The suction surfaces and the standing surface of each electrical contact element are in particular respectively aligned parallel to one another.

In a further advantageous example embodiment of the present invention, the electrical contact element comprises a passage in or near the standing surface, and the printed circuit board comprises at least one through-opening and the electrical contact element is positioned on the printed circuit board such that the passage and the through-opening adjoin one another. The printed circuit board in particular comprises exactly one through-opening for each electrical contact element mounted upon it.

In a further advantageous example embodiment of the present invention, the printed circuit board comprises at least one through-opening and the electrical contact element is mounted on the printed circuit board such that at least a portion of the latching arm points through the through-opening to a side facing away from the lens. In this configuration, the contact element can also have a passage in or near the standing surface. In this case, this passage would not be necessary for releasing the locking, but can be advantageous when creating the solder connection between the standing surface and the printed circuit board and also for better positioning. The printed circuit board in particular comprises exactly one through-opening for each electrical contact element mounted upon it.

In a further advantageous example embodiment of the present invention, the latching arm and the spring arm of the electrical contact element are disposed on opposite sides of the standing surface or on adjacent sides of the standing surface. If the standing surface of the electrical contact element is square, the latching arm and the spring arm are disposed facing one another in the first alternative. The first alternative has the advantage that the contact element is easier to produce. If the standing surface of the electrical contact element is square, the latching arm and the spring arm are disposed at a 90° angle to one another in the second alternative. The second alternative here has the advantage that better rigidity can be achieved.

According to an example embodiment of the present invention, the latching arm and the spring arm are in particular disposed such that they both project from the standing surface. The latching arm can then be configured in two parts, for instance, wherein the first portion of the latching arm is disposed such that it projects from the standing surface and the second portion of the latching arm is configured parallel to the standing surface on a side of the contact element opposite to the standing surface. In this case, the second portion of the latching arm can comprise the suction surface of the contact element. Alternatively, the spring arm can be configured in two parts, for instance, wherein the first portion of the spring arm is disposed such that it projects from the standing surface and the second portion of the spring arm is configured parallel to the standing surface on a side of the contact element opposite to the standing surface. In this case, the second portion of the spring arm can comprise the suction surface of the contact element. The second portion of the spring arm can then also comprise an extension, wherein the extension comprises the electrical contact surface.

The latching arm can be flat. In particular the first portion of the latching arm and/or the second portion of the latching arm can be flat. The latching arm or a portion of the latching arm can alternatively also be at least partially convex. The latching arm in particular comprises a fastening region. The fastening region is designed to lock the spring arm.

The spring arm can be flat. In particular the first portion of the spring arm and/or the second portion of the spring arm can be flat. The spring arm or a portion of the spring arm can alternatively also be at least partially convex. A convexity of the spring arm can advantageously improve the bending and/or spring properties of the spring arm. The spring arm in particular comprises a locking region. The locking region is in particular configured to interact with the fastening region of the latching arm to lock the spring arm.

It goes without saying that the aforementioned features and the features yet to be explained in the following can be used not only in the respectively specified combination, but also in other combinations or on their own, without leaving the scope of the present invention.

BRIEF DESCRIPTION OF THE DRAWINGS

Embodiment examples of the present invention are explained in more detail in the following with reference to the figures.

Identical reference signs in the figures denote identical or functionally identical features.

DETAILED DESCRIPTION OF EXAMPLE EMBODIMENTS

Figure 1:
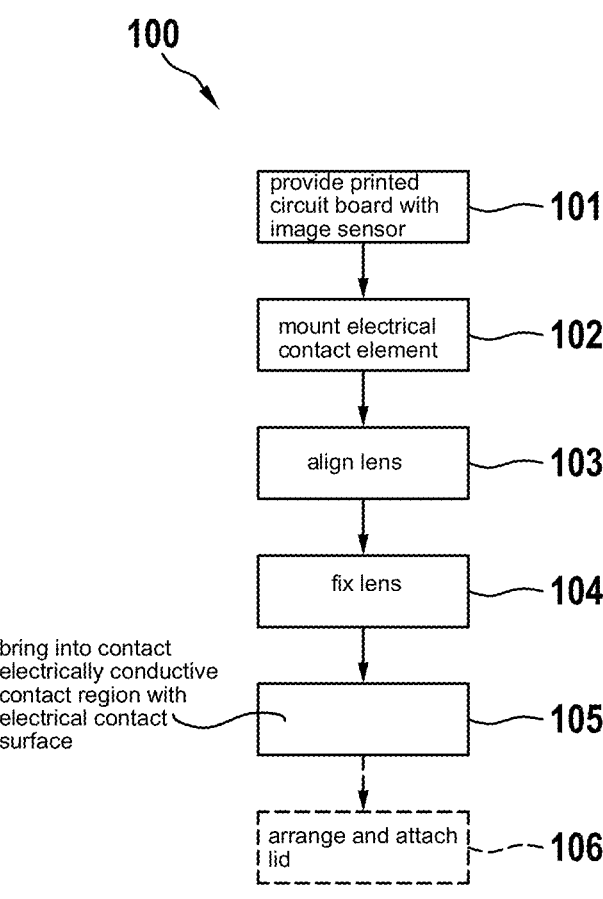
FIG. 1 shows an embodiment example of the method for producing a camera device, according to the present invention.

FIG. 1 shows an embodiment example of a method for producing a camera device. The camera can be intended for use in a vehicle, for instance. The method 100 comprises the steps of providing 101 a printed circuit board with an image sensor disposed upon it; mounting 102 at least one electrical contact element comprising a respective electrical contact surface on the printed circuit board; aligning 103 a lens accommodated in a housing of the camera device and having an electrically conductive contact region in relation to the image sensor; fixing 104 the lens in the housing and bringing into contact 105 the electrically conductive contact region of the lens with the electrical contact surface of the electrical contact element. The electrical contact element comprises a movable spring arm, on which the electrical contact point is disposed, and a movable latching arm. The latching arm locks the spring arm in a first position until the step of bringing into contact 105. In the step of bringing into contact 105, the locking of the spring arm is released by a temporary mechanical pulse applied to the latching arm by means of a release tool.

The method 100 can in particular comprise the further step 106 of arranging and attaching a lid to the housing of the camera device on a side facing away from the lens. The method 100 is explained in more detail, in particular with regard to the step of bringing into contact 105, with reference to the following figures.

Figure 2A:
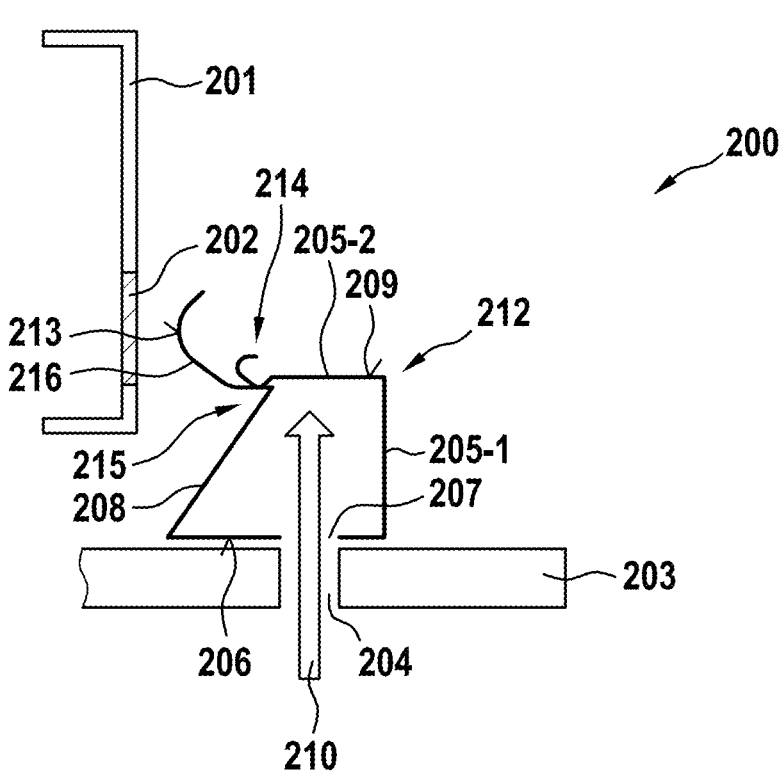
FIGS. 2A and 2B show an example of the step of bringing into contact the electrically conductive contact region of the lens with the electrical contact surface of the electrical contact element, according to the present invention.
Figure 2B:
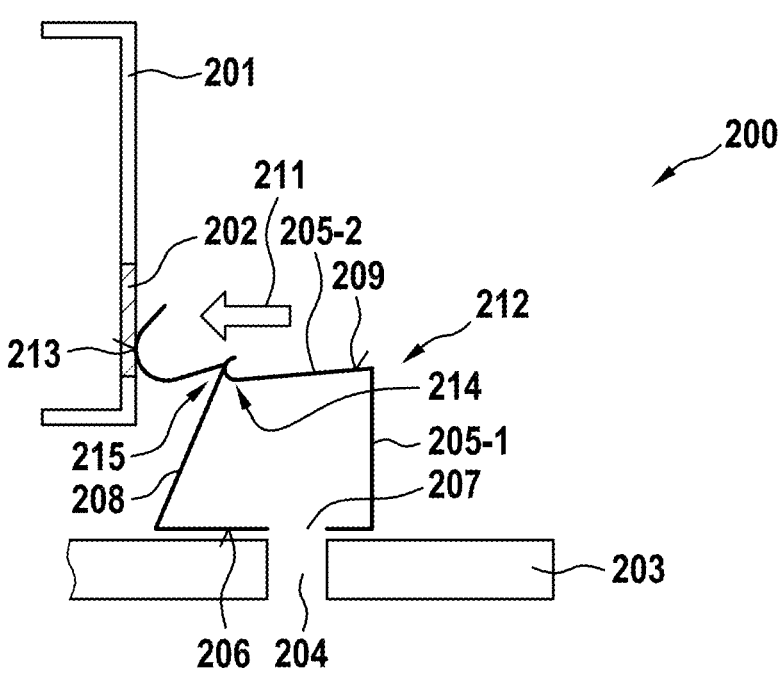

FIGS. 2A and 2B show a section of a camera device 200, in which, for the sake of simplicity, the housing of the camera device 200 is omitted. The camera device 200 comprises a printed circuit board 203. FIG. 2A in particular shows the camera device 200 up to or during the step 105 of bringing into contact of the method 100. FIG. 2B shows the camera device after step 105 of bringing into contact.

FIGS. 2A and 2B do not show an image sensor disposed on the printed circuit board. The camera device 200 further comprises a lens 201, which is accommodated and fixed in the housing and aligned with the image sensor. The lens 201 comprises an electrically conductive contact region 202. The contact element 212 comprising an electrical contact surface 213 is mounted on the printed circuit board 203 of the camera device 200. Only one contact element 212 can be seen in the section shown here. However, it is also possible for at least two contact elements 212 to be disposed on the printed circuit board 203. The following explanations for the one contact element 212 shown apply analogously to other contact elements 212 not shown here. The electrical contact element 212 of the camera device 200 comprises a movable spring arm 208, on which the electrical contact point 213 is disposed, and a movable latching arm 205.

In the example shown here, the electrical contact element 212 comprises the suction surface 209. In the step of mounting 102 of the above-described method 100, the electrical contact element 212 could thus be sucked onto the suction surface 209 by means of a fitting tool. This made it possible to position the electrical contact element 212 on the printed circuit board 203 very easily, but also very precisely. The electrical contact element 212 also comprises the standing surface 206. The contact element 212 was positioned on the printed circuit board 203 on this standing surface 206. In the step of mounting 102, a solder connection (not shown here) could be formed, for instance between the standing surface 206 and the printed circuit board 203.

In the example shown here, the latching arm 205 and the spring arm 208 are disposed on opposite sides of the standing surface 206. The latching arm 205 and the spring arm 208 are disposed such that they both project from the standing surface 206. The latching arm 205 shown here is configured in two parts. The first portion 205-1 of the latching arm 205 is disposed such that it projects from the standing surface 206. The second portion 205-2 of the latching arm 205 is configured on a side of the contact element 212 opposite to the standing surface 206 parallel to the standing surface 206. The second portion 205-2 of the latching arm 205 then comprises the suction surface 209. The first portion 205-1 and the second portion 205-2 of the latching arm 205 here are flat. At one end of the second portion 205-2, the latching arm 205 also comprises a fastening region 214 for locking the spring arm 208. The latching arm 208 shown here is initially flat as it projects from the printed circuit board 203, but in a section facing away from the printed circuit board 203 it has a convexity 216. The electrical contact surface 213 is disposed in the region of the convexity 216. Between the flat region and the region with the convexity 216, the spring arm 208 comprises a locking region 215, the purpose of which is to interact with the fastening region 214 of the latching arm 205 to lock the spring arm 208.

The electrical contact element 212 also comprises a passage 207 in the standing surface 206. In the section shown here, the printed circuit board 203 moreover comprises the through-opening 204. The electrical contact element 212 is positioned on the printed circuit board 203 such that the passage 207 and the through-opening 204 shown here adjoin one another. This can advantageously be used to release the locking of spring arm 208 as described in the following.

FIG. 2A shows an example of the method for producing the camera device 200 up to or at the step of bringing into contact 105 the electrically conductive contact region 202 of the lens 201 with the electrical contact surface 213 of the shown electrical contact element 212. Until the step of bringing into contact 105, the latching arm 205 locks the spring arm 208 in a first position. In this position, the contact surface 213 of the electrical contact element 212 is not yet in electrical contact with the electrically conductive contact region 202 of the lens 201.

In the step of bringing into contact 105, the locking of the spring arm 208 is released by a temporary mechanical pulse (shown in this example in FIG. 2A by the arrow 210) which is applied to the latching arm 205 by means of a release tool (not shown here). The electrically conductive contact region 202 of the lens 201 is thus configured to be in contact with the electrical contact surface 213 of the electrical contact element 212 as can be seen in FIG. 2B. The contact element 212 now exerts a contact force (shown by the arrow 211 in FIG. 2B) on the electrically conductive contact region 202 of the lens 201. The step of bringing into contact 105 of the method 100 is carried out analogously for other electrical contact elements 212 of the camera device 200.

Figure 3A:
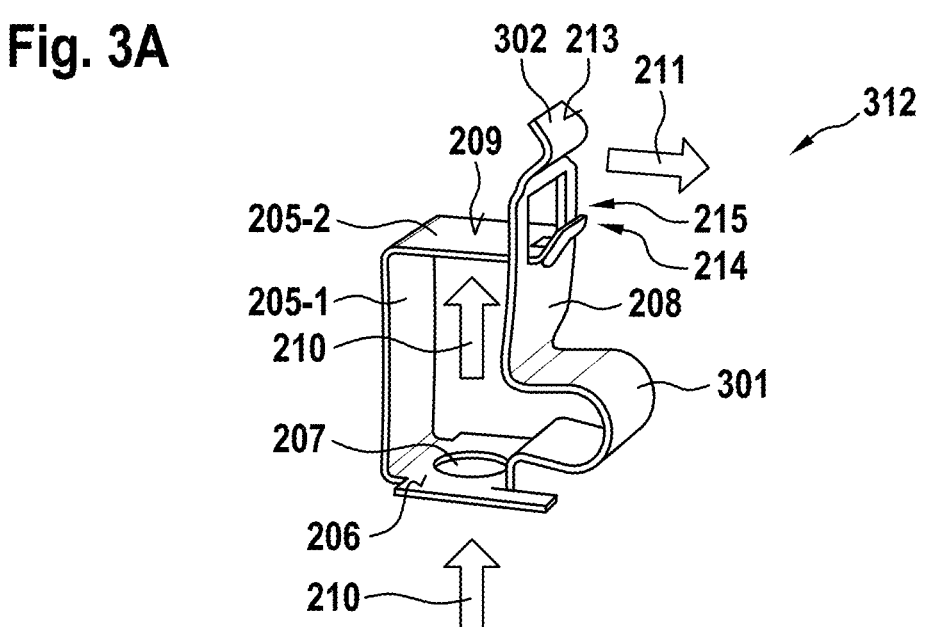
FIG. 3A shows a further embodiment example of an electrical contact element, according to the present invention.

FIG. 3A shows a further embodiment example of an electrical contact element. The contact element 312 shown in FIG. 3A is largely similar to the contact element 212 of FIG. 2, which is why primarily the differences are discussed in the following. The spring arm 208 of the contact element 312 is likewise disposed such that it projects from the standing surface 206, but comprises two convexities 301 and 302. The convexity 301 is located on a side of the spring arm 208 facing the standing surface 206. The convexity 301 can serve to improve the resilient properties of the spring arm 208. The convexity 302 is located on a side of the spring arm 208 facing away from the standing surface 206. The convexity 302 comprises the electrical contact surface 213. The locking region 215 of the spring arm 208 is configured as an opening on the contact element 312. The fastening region 214 of the latching arm 205 is or can be pushed into this opening 215 to lock the spring arm 208. The contact element 312 also comprises a passage 207. Here too, a not depicted release tool can be pushed through the passage 207 and apply a temporary mechanical pulse (again shown here as an example by the arrows 210), on the latching arm 205 to release the locking of the spring arm 208. The spring arm 208 can then exert a contact force (shown by the arrow 211) on an adjacently disposed lens. The spring arm 208 can in particular exert a contact force on an electrically conductive contact region of an adjacently disposed lens. This is explained again in the following for the contact element 312 with reference to FIG. 3B.

Figure 3B:
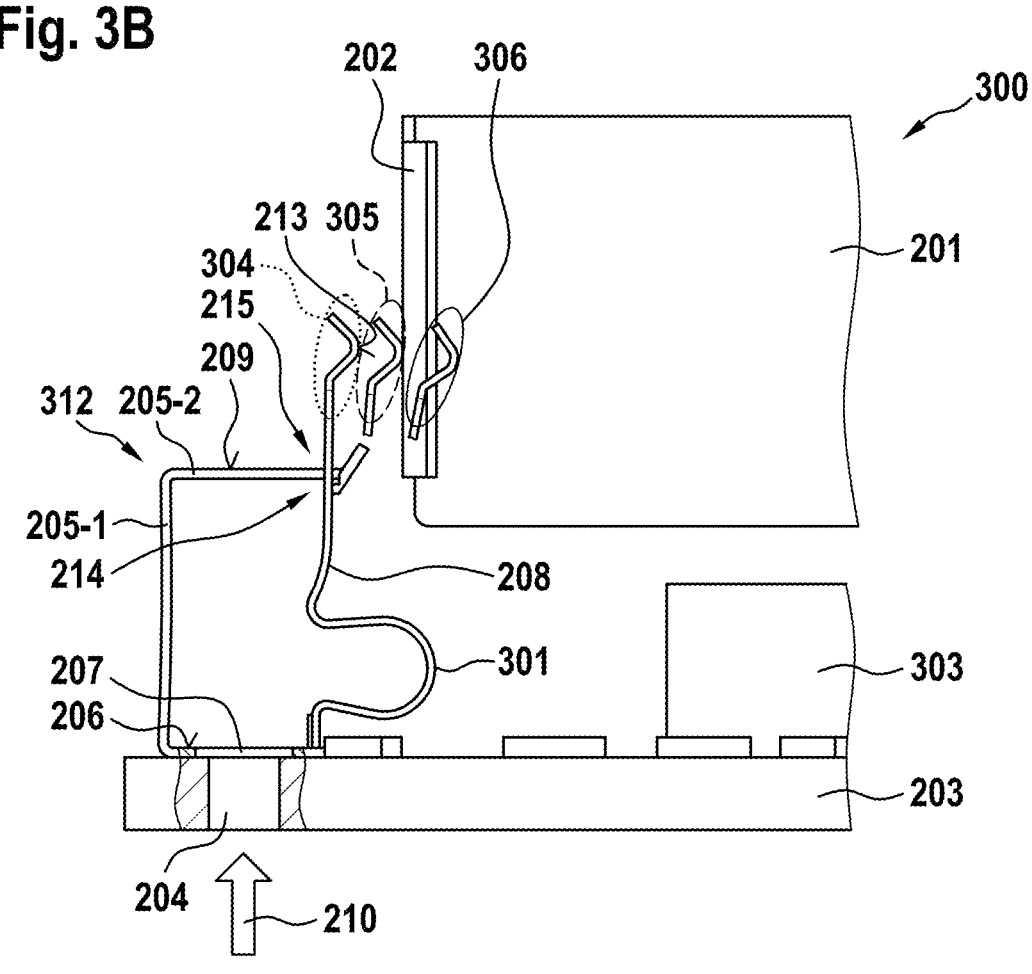
FIG. 3B shows an example of the step of bringing into contact a lens of a camera device by means of the electrical contact element of FIG. 3A.

FIG. 3B shows an example of the step of bringing into contact 105 a lens of a camera device 300 according to the method 100 by means of the electrical contact element 312 of FIG. 3A. FIG. 3B likewise has many similarities to FIGS. 2A and 2B, so that primarily the differences are discussed in the following. For instance, the image sensor 303 disposed on the printed circuit board 203 can be seen in FIG. 3B, too. It also shows how the positions of the spring arm 208 change when being brought into contact 105. The spring arm 208 is thus locked in a first position 304 until the step of step of bringing into contact 105. After the spring arm 208 is released, the spring arm is in a second position in which the electrical contact surface 213 of the contact element 312 is in contact with the electrically conductive contact region 202 of the lens 201. This is indicated as an example by the circle marked 305, in which only the region of the spring arm comprising the convexity 302 and the electrical contact surface 213 is shown. The circle marked 306 moreover indicates the position in which the spring arm 208 would be after the locking is released if the lens 201 were not disposed next to the contact element 312.

Figure 4A:
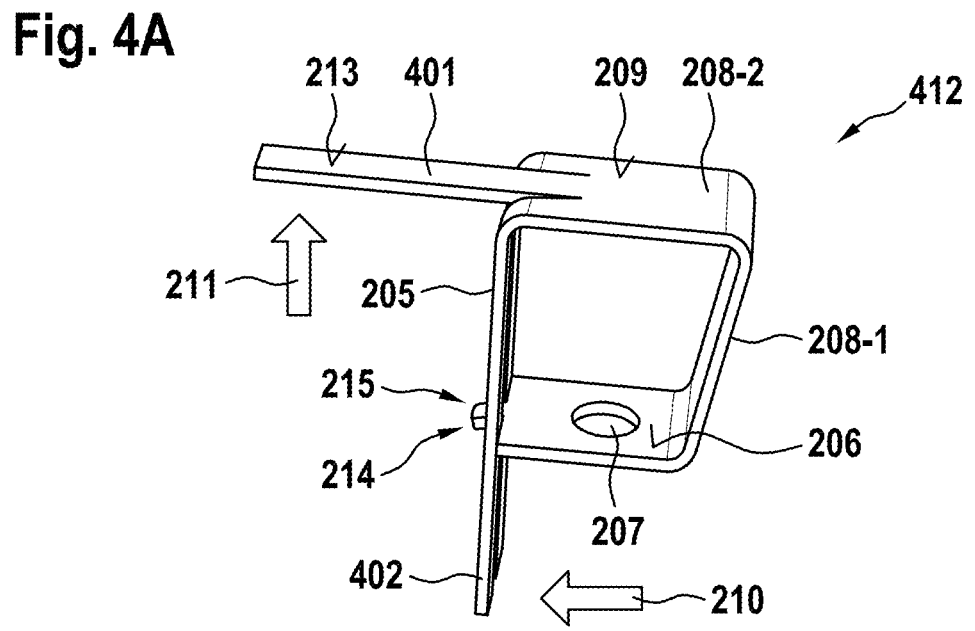
FIG. 4A shows a further embodiment example of an electrical contact element, according to the present invention.

FIG. 4A shows the electrical contact element 412 as a further embodiment example. Here too, primarily the differences to the contact elements 212 and 312 are discussed. The contact element 412, too, comprises a standing surface 206 with a passage 207. The latching arm 205 and the spring arm 208 are disposed on opposite sides of the standing surface 206 and disposed such that they project from the standing surface 206. Both the latching arm 205 and the spring arm 208 are flat. In this embodiment example, they comprise no convexities. However, a design with at least one convexity in the latching arm 205 and/or spring arm 208 is possible as well. In the case of the contact element 412, the spring arm 208 is configured in two parts. The first portion 208-1 of the spring arm 208 is disposed such that it projects from the standing surface 206. The second portion 208-2 of the spring arm 208 is configured on a side of the contact element 412 opposite to the standing surface 206 parallel to the standing surface 206. The second portion 208-2 of the spring arm 208 then comprises the suction surface 209. The second portion 208-2 of the spring arm 208 of the contact element 412 shown here further comprises an extension 401. The extension 401 comprises the electrical contact surface 213. In the case of the contact element 412, the standing surface 206 can moreover be considered a portion of the spring arm 208 as well. The locking region 215 of the spring arm 208 is disposed on a side of the standing surface 206 facing away from the first portion 208-1 of the spring arm 208.

The latching arm 205 of the contact element 412 likewise comprises an extension 402. The extension 402 extends from the standing surface 206 to a side facing away from the suction surface 209. In the case of the contact element 412, the fastening region 214 of the latching arm 205 is configured as an opening. The locking region 215 of the spring arm 208 is or can be pushed into this opening to lock the spring arm 208.

In the contact element 412 described here, in the step of bringing into contact 105 of the above-described method 100, a temporary mechanical pulse (shown by the arrow 210) is applied to the extension 402 of the latching arm 205, as a result of which the locking of the spring arm 208 is released. The extension 401 of the spring arm 208 thus moves upward away from the standing surface 206 and can exert a contact force 211 on an adjacently disposed lens. The spring arm 208 can in particular exert a contact force on an electrically conductive contact region of an adjacently disposed lens.

Figure 4B:
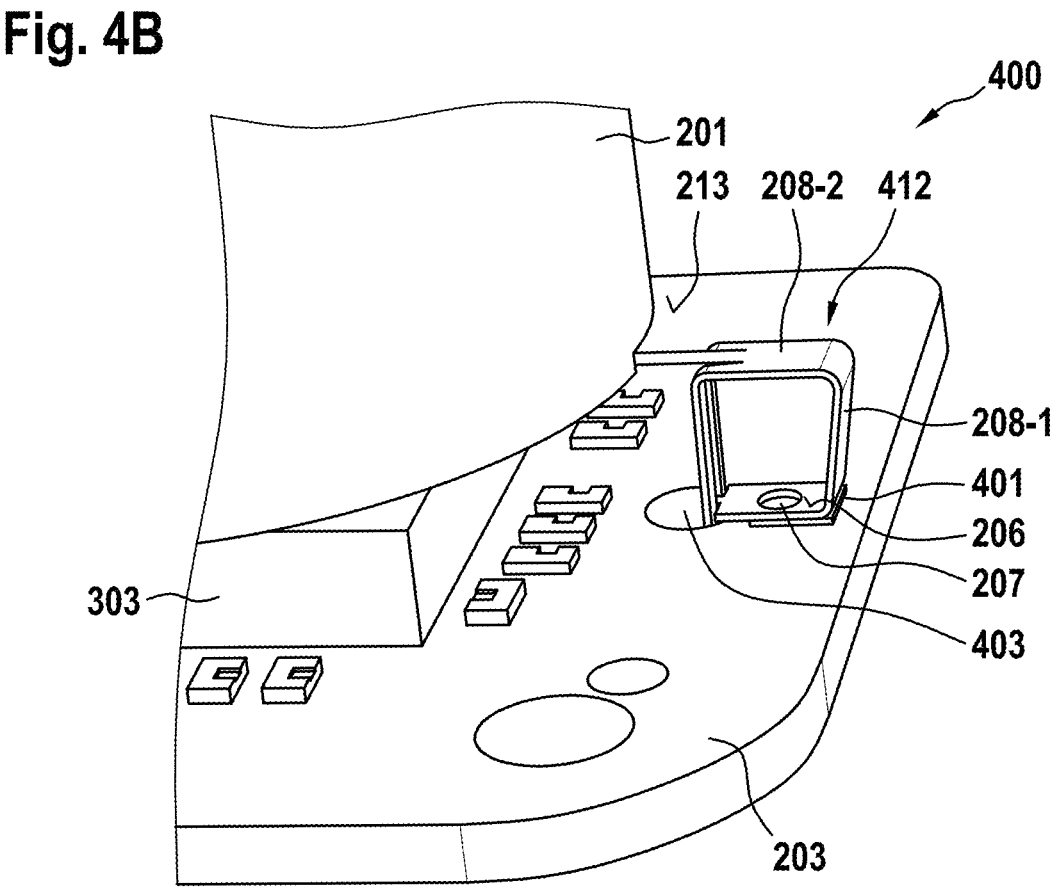
FIG. 4B shows a section of a camera device comprising an electrical contact element of FIG. 4A.

FIG. 4B shows a section of a camera device 400 comprising an electrical contact element of FIG. 4A. Here, too, primarily the differences to FIGS. 2A and 2B, and 3B, are discussed in the following. The electrical contact element 412 is positioned on its standing surface 206 on the printed circuit board 203 and is fixedly disposed on the printed circuit board 203 by means of the solder connection 401 that can be seen here.

The printed circuit board 203 of the camera device 400 also comprises a through-opening 403, which is associated with the release of the locking of the spring arm to 208. However, unlike the camera devices 200 and 300, the electrical contact element 412 here is positioned on the printed circuit board 203 such that at least a portion of the latching arm 205 points through the through-opening 403 to a side facing away from the lens 201. The extension 402 of the latching arm 205 in particular points through the through-opening 403. To trigger the temporary mechanical pulse, a release tool is or was pushed along the side of the printed circuit board 203 facing away from the lens 201 parallel to the printed circuit board. The locking is or was thus released by a lateral force pulse below the printed circuit board 203. The electrically conductive contact region of the lens 201 is thus brought into contact with the electrical contact surface 213 of the contact element 412. As can be seen from FIG. 4B, in this example the electrically conductive contact region of the lens 201 is not on the outside of the lens 201, but rather on a side facing the printed circuit board 203. In other words, the electrically conductive contact region of the lens 201 is located on an underside of the lens 201. As already described above, the spring arm 208 moves upward when the locking is released, so that the electrical contact surface of the contact element 412 is in contact with the electrically conductive contact region of the lens 201.

Figure 5:
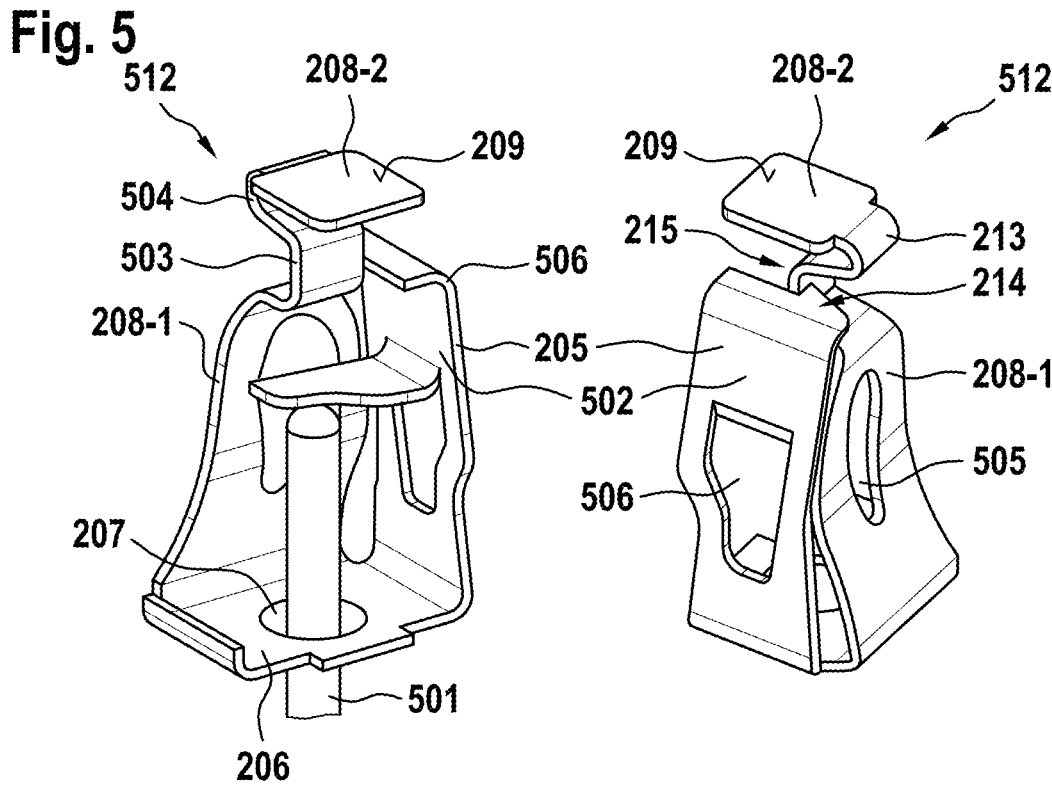
FIG. 5 shows a further embodiment example of an electrical contact element, according to the present invention.

FIG. 5 shows the electrical contact element 512 as a further embodiment example from two viewing directions. The electrical contact element 512 then comprises a movable spring arm 208, on which the electrical contact point 213 is disposed, and a movable latching arm 205. The electrical contact element 512 comprises a standing surface 206 with a passage 207. In this embodiment example, the latching arm 205 and the spring arm 208 are disposed on adjacent sides of the substantially square standing surface 206. The latching arm 205 and the spring arm 208 are again disposed such that they both project from the standing surface 206. The spring arm 208 is configured in two parts here. The first portion 208-1 of the spring arm 208 is disposed such that it projects from the standing surface 206. The second portion 208-2 of the spring arm 208 is configured on a side of the contact element 512 opposite to the standing surface 206 parallel to the standing surface 206. The second portion 208-2 of the spring arm 208 then comprises the suction surface 209. The second portion 208-2 of the spring arm 208 is flat. The first portion 208-1 of the spring arm 208, on the other hand, comprises the convexities 503 and 504. The convexity 503 is then in particular part of the locking region 215 of the spring arm 208. The electrical contact surface 213 is disposed in the region of the second convexity 504. In its first portion 208-1, the spring arm 208 furthermore also comprises the opening region 505. The latching arm 205 of the electrical contact element 512 is largely flat and only has the convexity 506 on an end opposite to the standing surface 206. The convexity 506 is part of the fastening region 214 of the latching arm 205 for locking the spring arm 208. To release the locking, a release tool 501 can be passed through the passage 207 of the contact element 512 as shown in the left part of FIG. 5. The release tool 501 hits a release clip 502. The release clip 502 is a part of the latching arm 205. The release clip 502 is cut out of the latching arm 205 here in such a way that an opening region 506 is created in the latching arm 205. The resulting temporary mechanical pulse on the latching arm 205 releases the locking of the spring arm 208.

Figure 6:
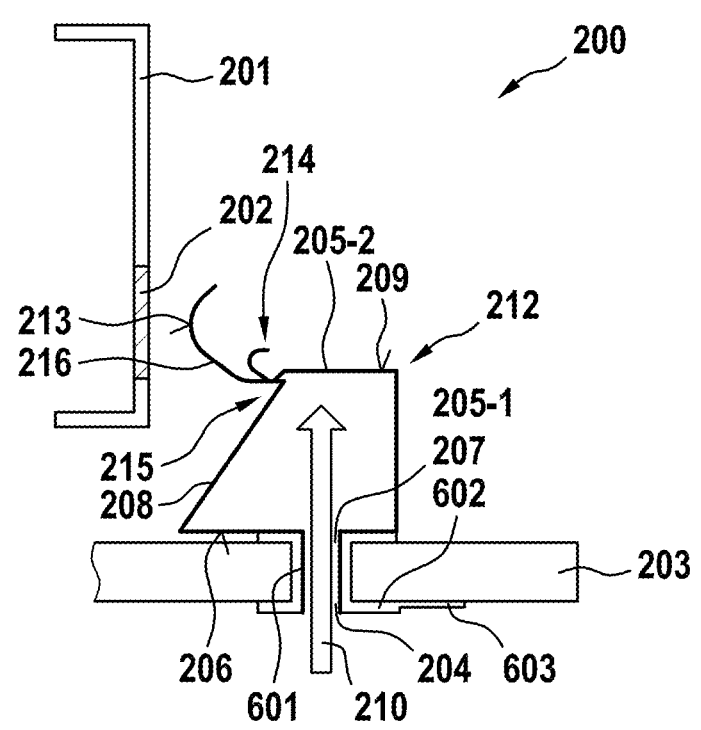
FIG. 6 shows an alternative way of fastening an electrical contact element to the printed circuit board, according to an example embodiment of the present invention.

In the embodiment examples of FIGS. 2A and 2B, 3B and 4B, the electrical contact elements are mounted on the printed circuit board such that a solder connection is formed between the standing surface 206 and the printed circuit board 203. FIG. 6 shows an alternative way of fastening an electrical contact element 212 to the printed circuit board 203. This alternative can also be used for the contact elements 212, 312 and 412 shown in 2A and 2B, 3B and 4B, and also when attaching the contact element 512 shown in FIG. 5.

FIG. 6 is largely similar to FIG. 2A, so that only the differences are described in the following. In this example, the electrical contact element 212 further comprises a press-fit contour 601. The press-fit contour 601 is then aligned from the standing surface 206 to a side facing away from the suction surface 209. A sleeve 602 with a conductor track 603 leading away from the sleeve 602 on an underside of the printed circuit board 203 is furthermore disposed in the through-opening 204 of the printed circuit board 203. In the step of mounting the electrical contact element 212 on the printed circuit board 203, the electrical contact element 212 can be pressed into the printed circuit board 203. FIG. 6 shows how the electrical contact element 212 is already pressed into the printed circuit board 203. The press-fit contour 601 is disposed pressed into in the through-opening 204 of the printed circuit board 203. The press-fit contour 601 is disposed in the through-opening 204 of the printed circuit board 203 such that it is in electrical contact with the sleeve 602.

The invention claimed is:

1. A method for producing a camera device, comprising the following steps:

provicing a printed circuit board with an image sensor disposed upon the printed circuit board;

mounting at least one electrical contact element having an electrical contact surface on the printed circuit board;

aligning a lens, which is accommodated in a housing of the camera device and which includes an electrically conductive contact region, with respect to the image sensor;

fixing the lens in the housing; and bringing into contact the electrically conductive contact region of the lens with the electrical contact surface of the electrical contact element;

wherein:

the electrical contact element includes a movable spring arm on which the electrical contact surface is disposed, and a movable latching arm, the latching arm locks the spring arm in a first position until the step of bringing into contact, and in the step of bringing into contact, the locking of the spring arm is released by a temporary mechanical pulse applied to the latching arm via a release tool.

2. The method according to claim 1, wherein, in the step of mounting, the electrical contact element is sucked onto a suction surface of the electrical contact element via a fitting tool and positioned on a standing surface of the electrical contact element on the printed circuit board, and wherein: (i) a solder connection is formed between the standing surface and the printed circuit board, or (ii) the electrical contact element is pressed into the printed circuit board.

3. The method according to claim 2, wherein the electrical contact element includes a passage in or near the standing surface, and wherein the printed circuit board includes at least one through-opening, and wherein the electrical contact element is positioned on the printed circuit board in the step of mounting such that the passage and the through-opening adjoin one another, and wherein, to trigger the temporary mechanical pulse, the release tool is pushed from a side of the printed circuit board facing away from the lens through the through-opening of the printed circuit board and the passage of the electrical contact element.

4. The method according to claim 1, wherein the printed circuit board includes at least one through-opening, and wherein the electrical contact element is positioned in the step of mounting on the printed circuit board such that at least a portion of the latching arm points through the through-opening to a side facing away from the lens, and wherein, to trigger the temporary mechanical pulse, the release tool is pushed parallel to the printed circuit board along the side facing away from the lens.

5. A camera device for a vehicle, comprising:

a printed circuit board with an image sensor disposed upon the printed circuit board;

at least one electrical contact element which includes an electrical contact surface and is mounted on the printed circuit board;

a housing;

a lens which is accommodated and fixed in the housing, is aligned with the image sensor and includes an electrically conductive contact region, wherein the electrically conductive contact region of the lens is configured to be in contact with the electrical contact surface of the electrical contact element;

wherein:

the electrical contact element includes a movable spring arm on which the electrical contact surface is disposed, and a movable latching arm, the latching arm is configured to lock the spring arm in a first position, and to form the contact between the electrically conductive contact region of the lens and the electrical contact surface of the electrical contact element, the locking of the spring arm in the camera device is configured such that it is released by a temporary mechanical pulse applied to the latching arm via a release tool.

6. The camera device of claim 5, wherein the electrical contact element includes a suction surface and a standing surface, and wherein: (i) a solder connection is formed between the standing surface and the printed circuit board, or (ii) the standing surface of the electrical contact element is pressed into the printed circuit board.

7. The camera device according to claim 6, wherein the electrical contact element includes a passage in or near the standing surface, and wherein the printed circuit board includes at least one through-opening, and wherein the electrical contact element is positioned on the printed circuit board such that the passage and the through-opening adjoin one another.

8. The camera device according to claim 5, wherein the printed circuit board includes at least one through-opening, and wherein the electrical contact element is mounted on the printed circuit board such that at least a portion of the latching arm points through the through-opening to a side facing away from the lens.

9. The camera device according to claim 6, wherein the latching arm and the spring arm of the electrical contact element are disposed on opposite sides of the standing surface or on adjacent sides of the standing surface.

\* \* \* \* \*